Patented July 19, 1932

1,868,065

UNITED STATES PATENT OFFICE

GEORG JAECKEL, OF BERLIN-LICHTERFELDE, GERMANY, ASSIGNOR TO FIRM SENDLINGER OPTISCHE GLASWERKE G. M. B. H., OF BERLIN-ZEHLENDORF, GERMANY

COLORLESS GLASS

No Drawing. Application filed November 20, 1930, Serial No. 497,071, and in Germany November 22, 1929.

The present invention relates to a method of producing colorless glass, and to a refractory material employed in the performance of this method.

The production of colorless glass calls for the adoption of particular measures which are destined to counteract the unavoidable impurities occurring in the molten mass or flux and leading to discoloration.

The principal contamination or impurity liable to occur consists in a certain percentage of iron, for which, according to existing practice, compensation is made by adding to the mass in a quantity depending on the amount of iron a suitable substance, for example peroxide of manganese, for the purpose of converting the iron from the greatly coloring oxydul form into a weakly coloring oxide, and by neutralizing the color imparted to the glass flux by the iron oxide by the addition of a coloring agent, which produces a complementary color. This agent, dependent on the particular shade or tone concerned, may consist, for example, of cobalt oxide or selenium. It is therefore usual for the purpose of avoiding undesirable discoloration of the glass to employ both chemical means, for example in the present case peroxide of manganese, in order to produce a chemical change in the oxidizing stage of the iron, as well as physical means, for example in the present case coloring agents, for the purpose of producing complementary colors.

Although the possibility exists, by way of analysis, of determining the impurities in the batch and accordingly of also determining with reasonable exactitude the necessary amount of decoloring agent required, this method is extremely deficient in practice, since in addition to the impurities in the batch itself other impurities or contaminations also occur which emanate from the crucible (melting pot or bath) and from the refractory rings, which are usually placed on the melted glass to enable pure glass to be taken from the crucible Impurities falling from the top of the crucible may also have an undesirable effect on the color of the flux.

Since the impurities resulting from a fusing of the material forming the crucible together with those impurities which enter the crucible in the ordinary course of events are wholly incapable of being controlled in their actual amount, which may very greatly vary at different times in accordance with the different currents set up in the crucible under varying temperatures, and also in accordance with the exact composition of the batch and the nature of the material forming the crucible, it has not been possible heretofore to combat these sources of undesirable coloration with any degree of success.

It is the object of the present invention to overcome the drawback in question, and this is accomplished by not only employing means for counter-acting discoloration of the flux, but also by separating such counter-action so that only the discoloration arising from impurities in the batch itself are subjected to the action of suitable additions, while discoloration arising from the material of the crucible are counteracted by incorporating the necessary additions in the crucible material itself.

In this connection care must naturally be taken that only such additions are employed which have no detrimental effect on the refractory nature and power of resistance of the material and are also capable of withstanding both the treatment to which the refractory material is subjected during its production as well as the temperature occurring externally upon the heating of the crucible and that emanating on the inside of the crucible from the molten glass, so that together with the fusing refractory material and the impurities contained therein the neutralizing agent is also capable of passing into the flux in the predetermined proportion and exerting the desired action.

As a chemically acting decoloring agent in conjunction with iron there may be employed in this case substances of the usual kind, such for example as peroxide of manganese. In so far as any difficulties may be encountered in connection with this particular substance when employing relatively large quantities as regards the ageing or ripening of the clay the same may also be added to the clay after sumping has been completed.

As physically acting decoloring agent for the iron compounds converted by the peroxide of manganese it would be impossible to employ selenium as mentioned above in the usual metallic form. On the other hand selenide of zinc, which is capable of resisting high temperature, will be found perfectly suitable. No objection will be encountered in adding to the refractory material decoloring agents such as nickel oxide and cobalt oxide. For example, the desired result may be obtained by adding to a crucible material containing approximately 2% $Fe_2O_3$ an addition of, say, .25% $NiO$.

Although as a general rule other impurities tending to result in a different color when contacting with the glass will not occur in the case of iron compound, it will obviously nevertheless be possible to also apply the same method of neutralization to other impurities of any particular kind which may occur, in which connection attention merely requires to be paid to the fact that under normal conditions of operation the agent concerned is capable of offering such resistance that the same only enters the flux together with any fused material of the crucible.

It will be understood that no restriction is made to the specific substances above referred to, and that various modifications are quite possible within the meaning of the annexed claims without departing from the spirit of the invention.

What I claim as new and desire to secure by Letters Patent is:—

1. A method of producing colorless glass, consisting in adding to the flux chemical materials capable of neutralizing discoloration arising from impurities entering the flux in the ordinary course of events, and preparing the flux in a crucible which has incorporated in the refractory material thereof decoloring agents serving to counteract discoloration arising from fusing of the crucible material.

2. A crucible for the production of colorless glass, characterized in that the refractory material thereof possesses incorporated therein a percentage of neutralized substances in a quantity dependent on the proportion of discoloring substance in the crucible, which neutralizing substances are adapted to withstand the high temperatures to which the crucible is subjected in use without vaporization.

In testimony whereof I have affixed my signature.

GEORG JAECKEL.